United States Patent
Iyer et al.

(10) Patent No.: US 11,010,125 B1
(45) Date of Patent: May 18, 2021

(54) REDUCING AUDIO-BASED DISTRACTIONS IN AN INFORMATION HANDLING SYSTEM

(71) Applicant: Dell Products L.P., Round Rock, TX (US)

(72) Inventors: Vivek Viswanathan Iyer, Austin, TX (US); Michael S. Gatson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 13 days.

(21) Appl. No.: 16/720,668

(22) Filed: Dec. 19, 2019

(51) Int. Cl.
| | |
|---|---|
| G06F 3/16 | (2006.01) |
| G06N 20/00 | (2019.01) |
| G06N 5/04 | (2006.01) |
| H04R 29/00 | (2006.01) |
| G10K 11/178 | (2006.01) |
| H04N 7/15 | (2006.01) |
| G10L 25/51 | (2013.01) |

(52) U.S. Cl.
CPC ............. G06F 3/165 (2013.01); G06N 5/04 (2013.01); G06N 20/00 (2019.01); G10K 11/178 (2013.01); G10L 25/51 (2013.01); H04N 7/15 (2013.01); H04R 29/001 (2013.01)

(58) Field of Classification Search
CPC .......... G06F 3/165; G06N 20/00; G06N 5/04; G10L 25/51; H04N 7/15; H04R 29/001; G10K 11/178
See application file for complete search history.

(56) References Cited

U.S. PATENT DOCUMENTS

| | | | | |
|---|---|---|---|---|
| 8,154,578 | B2* | 4/2012 | Kurtz | G06K 9/00335 348/14.01 |
| 8,253,770 | B2* | 8/2012 | Kurtz | H04N 7/142 348/14.01 |
| 8,593,502 | B2* | 11/2013 | Saleh | G06F 3/041 348/14.03 |
| 10,057,621 | B2* | 8/2018 | Wexler | G06K 9/4676 |
| 10,477,146 | B2* | 11/2019 | McArdle | H04N 7/147 |
| 10,848,895 | B2* | 11/2020 | Peeler | G10L 25/51 |
| 2010/0238262 | A1* | 9/2010 | Kurtz | H04N 7/142 348/14.01 |
| 2010/0245532 | A1* | 9/2010 | Kurtz | G06K 9/3216 348/14.03 |

* cited by examiner

*Primary Examiner* — David L Ton
(74) *Attorney, Agent, or Firm* — Baker Botts L.L.P.

(57) ABSTRACT

Reducing audio-based distractions in an information handling system, including performing, by an audio focus computing module and at a first time, a calibration and configuration of an audio focus model, performing, by the audio focus computing module at a second time, a steady-state monitoring of the information handling system, including applying the one or more configuration rules to perform one or more of the computer-implemented actions to automatically enable the video conference of the video conferencing application executing on the information handling system without user interaction.

20 Claims, 3 Drawing Sheets

REDUCING AUDIO-BASED DISTRACTIONS IN AN INFORMATION HANDLING SYSTEM

BACKGROUND

Field of the Disclosure

The disclosure relates generally to an information handling system, and in particular, reducing audio-based distractions in the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Immersive productivity focuses on creating an immersive environment that allows a user of an information handling system to stay in his/her work flow. The creation of the immersive environment centers on the elimination of external distractions, providing assistance to the user on key tasks, and augmented capabilities to improve productivity. The elimination of distractions includes blocking interruptions such as notifications and alerts, as well as providing indications such as do-not-disturb to other parties. Assistance to the user includes contextually-driven actions and performance enhancements based on the users' current tasks.

SUMMARY

Innovative aspects of the subject matter described in this specification may be embodied in a method including performing, by an audio focus computing module and at a first time, a calibration and configuration of an audio focus model, including: identifying contextual data associated with contextual inputs to the information handling system, the contextual data including user settings contextual data, system settings contextual data, and environmental settings contextual data; training, based on the contextual data, the audio focus model, including generating a configuration policy including configuration rules, the configuration rules for automatically performing computer-implemented actions for enabling a video conference of a video conferencing application executing on the information handling system without user interaction; performing, by the audio focus computing module at a second time, a steady-state monitoring of the information handling system, including: monitoring the contextual inputs of the information handling system; and in response to monitoring the contextual inputs, i) accessing the audio focus model including the configuration policy, ii) identifying one or more of the configuration rules based on the monitored contextual inputs, and iii) applying the one or more configuration rules to perform one or more of the computer-implemented actions to automatically enable the video conference of the video conferencing application executing on the information handling system without user interaction.

Other embodiments of these aspects include corresponding systems, apparatus, and computer programs, configured to perform the actions of the methods, encoded on computer storage devices.

These and other embodiments may each optionally include one or more of the following features. For instance, determining that the information handling system has transitioned to a second power state from a first power state, the second power state being an idle standby power state; while the information handling system is in the second power state, storing data associated with the monitored contextual inputs; determining that the information handling system has transitioned from the second power state to the first power state; and in response to determining that the information handling system has transitioned from the second power state to the first power state, i) accessing the audio focus model including the configuration policy, ii) identifying one or more of the configuration rules based on the monitored contextual inputs, and iii) applying the one or more configuration rules to perform one or more of the computer-implemented actions to automatically enable the video conference of the video conferencing application executing on the information handling system without user interaction. Applying the one or more configuration rules includes automatically selecting a hyperlink associated with the video conference. Applying the one or more configuration rules includes automatically selecting an audio source and/or video source associated with the video conference. Applying the one or more configuration rules includes automatically toggling a mute option associated with the video conference. Monitoring the contextual inputs includes determining a connection status between an audio-based peripheral and the information handling system. Monitoring the contextual inputs includes identifying a location of the information handling system. Monitoring the contextual inputs including identifying a current time. Monitoring the contextual inputs includes identifying environment ambient noise levels. The configuration rules further include configuration rules for automatically adjusting audio-based settings of the information handling system without user interaction. Applying the one or more configuration rules further includes applying the one or more configuration rules to automatically adjust the one or more audio settings of the information handling system without user interaction. Applying the one or more configuration rules includes automatically selecting an audio input source. Applying the one or more configuration rules includes automatically selecting a local noise cancellation level. Applying the one or more configuration rules includes automatic source separation of input audio. Applying the one or more configuration rules includes automatically selecting an audio output source.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
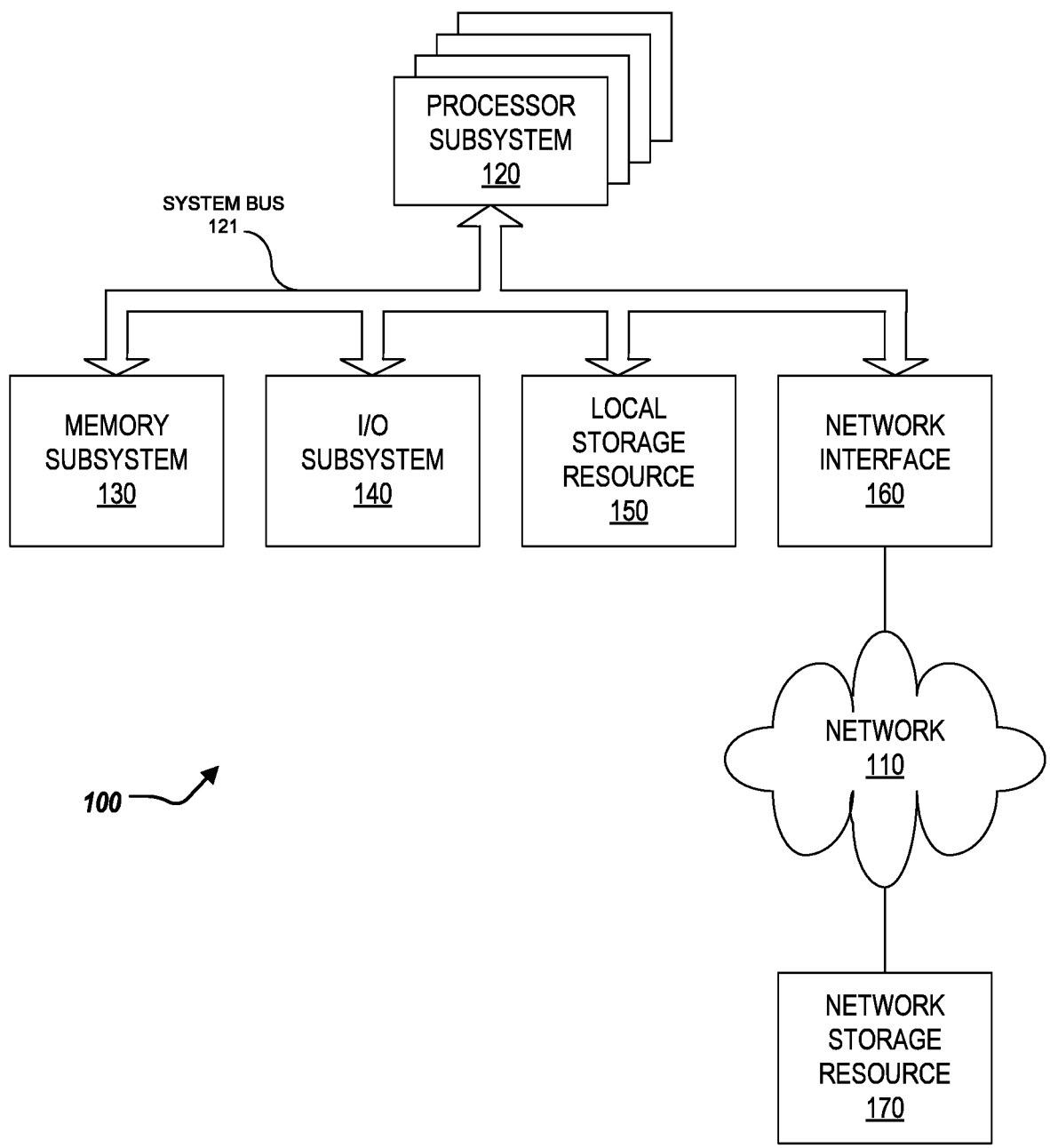
FIG. 1 is a block diagram of selected elements of an embodiment of an information handling system.
Figure 2:
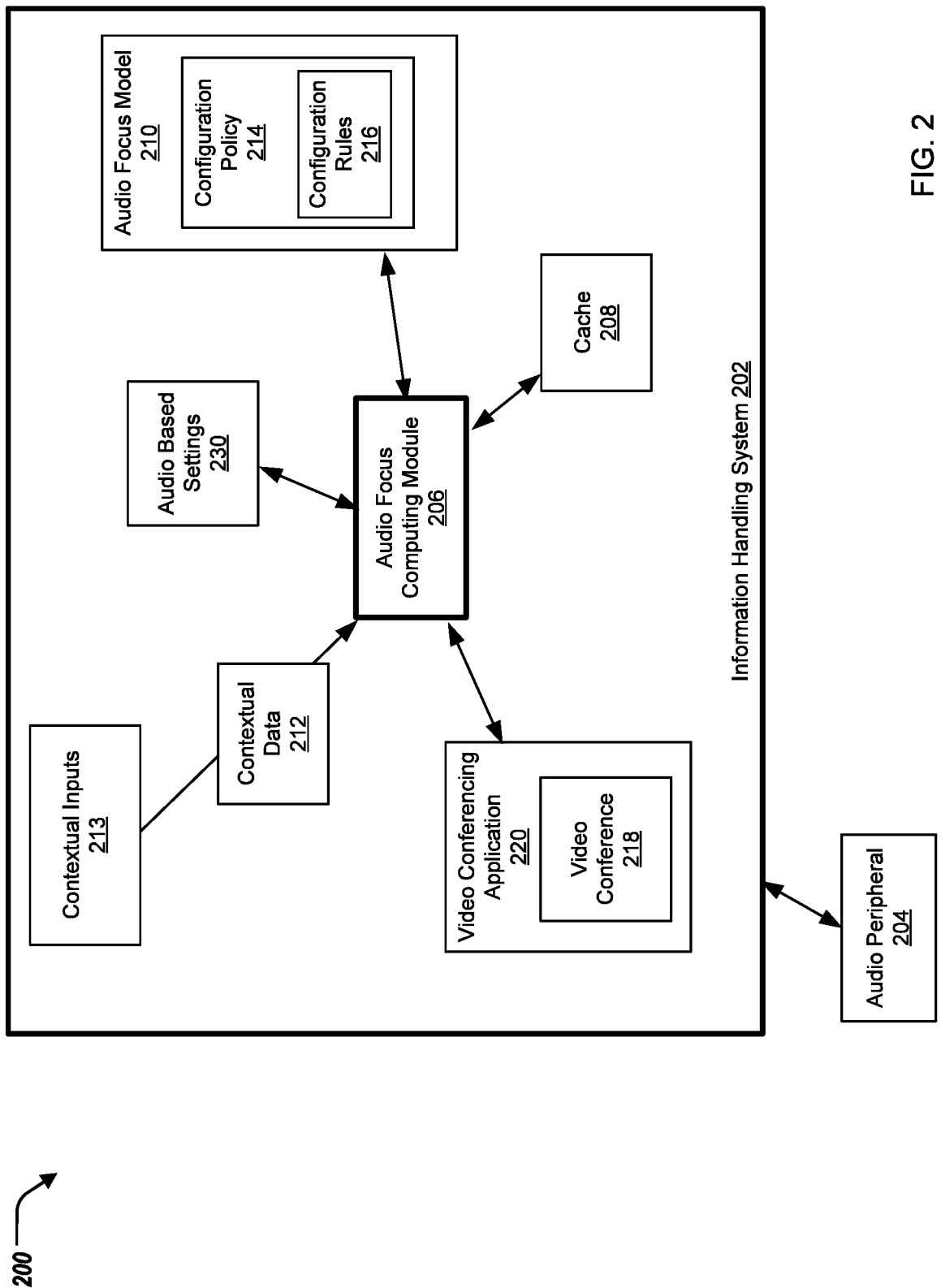
FIG. 2 illustrates a block diagram of the information handling system for reducing audio-based distractions in an information handling system.
Figure 3:
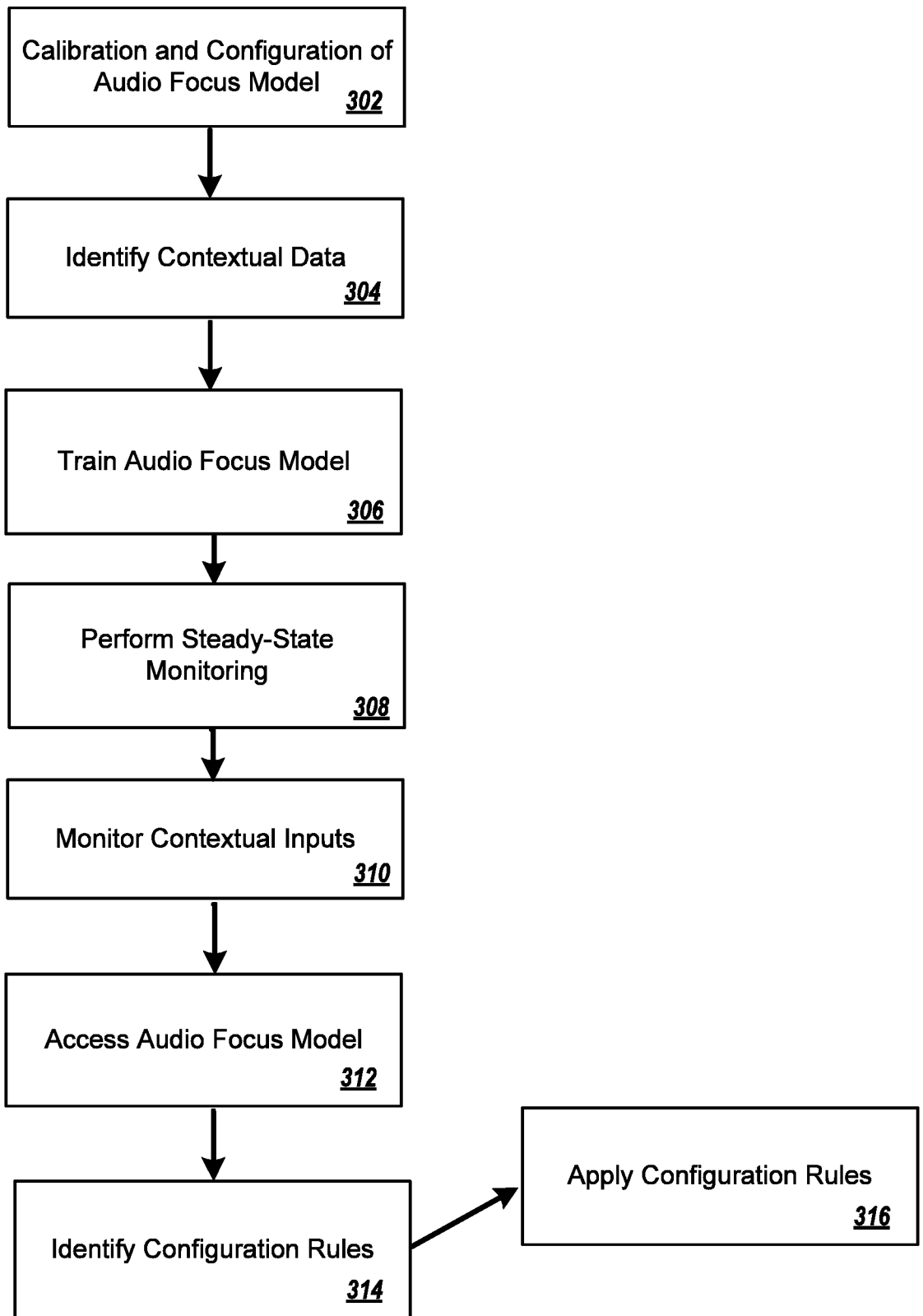
FIG. 3 illustrates a method for reducing audio-based distractions in an information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning to FIG. 2, FIG. 2 illustrates a computing environment 200 including an information handling system 202 and an audio peripheral 204. The information handing system 202 can be in communication with the audio peripheral 204. The information handling system 202 can include an audio focus computing module 206 and a cache 208. The audio focus computing module 206 can be in communication with the cache 208. In some examples, the IHS 202 is similar to, or includes, the information handling system 100 of FIG. 1.

In short, the computing environment 200 can facilitate eliminating audio distractions of the information handling system 202 when used by a user of the information handling system 200. Eliminating the audio distractions can provide an enhanced immersion and maintain focus by the user to increase productivity of the user. To eliminate the audio distractions, the information handling system 202 can reduce the steps to initiate audio sessions of the information handling system 202, e.g., video conferencing sessions, described further herein.

In some implementations, the audio focus computing module 206 can perform, at a first time, a calibration and configuration of an audio focus model 210. Specifically, performing of the calibration and the configuration of the audio focus model 210 can include identifying contextual data 212 associated with contextual inputs 213 of the information handling system 202. Specifically, the contextual data 212 can include such contextual data as user settings contextual data, system settings contextual data, and environment settings contextual data. For example, the contextual data 212 can include such contextual data as a connection status between the audio peripheral 204 and the information handling system 202. The connection status can include a physical coupling status between the audio peripheral 204 and the information handling system 202 and/or a communication coupling status between the audio peripheral 204 and the information handling system 202. The contextual data 212 can include such contextual data as a physical location of the information handling system 202, a current time associated with the information handling system 202, and ambient noise levels proximate to the information handling system 202. Further, the contextual data 212 can include such contextual data as active applications (e.g., audio/video applications) of the information handling system 202, an audio volume of the information handling system 202, and a noise cancellation by the information handling system 202. The contextual data 212 can include such contextual data as types of devices/peripherals coupled/connected to the information handling system 202.

In some implementations, the audio focus computing module 206 can train, based on the contextual data 212, the audio focus model 210. Specifically, the audio focus computing module 206 can generate, based on the contextual data 212 identified at the first time, a configuration policy 214 that includes configuration rules 216. In some examples, the configuration rules 216 are rules for automatically performing computer-implemented actions for enabling a video conference 218 of a video conferencing application 220 executing on the information handling system 202 without user interaction. In some examples, the configuration rules 216 are rules for automatically adjusting audio-based settings of the information handling system 202 without user interaction.

To that end, the audio focus computing module 206 can train the audio focus model 210 to establish connections between the contextual data 212 and the configuration rules 216. Specifically, the audio focus model 210 can identify one or more configurations rule 216 to be applied based on a connection with the one or more of the contextual data 212. In some examples, the audio focus computing module 206 can train the audio focus model 210 using a machine learning process, and/or a neural network.

In some examples, the configuration rules 216 can include automatically selecting a hyperlink associated with the video conference 218, selecting an audio source and/or video source associated with the video conference 218, and toggling a mute option associated with the video conference 218. In some examples, the configuration rules 216 can include automatically selecting an audio input source, automatically selecting a local noise cancellation level, automatic source separation of input audio, and automatically selecting an audio output source. In some implementations, the audio focus computing module 206 can perform, at a second time after the first time, a steady-state monitoring of the information handling system 202. In other words, the audio focus computing module 206 can monitor the information handling system 202, and in particular, the context input 214, for computer-related events that could trigger activation of the contextual rules 216 by the audio focus computing module 206.

Specifically, the audio focus computing module 206 can monitor the contextual inputs 213 of the information handling system 202. In some examples, the audio focus computing module 206 can monitor the contextual data 212 such as user settings contextual data, system settings contextual data, and environment settings contextual data. For example, the audio focus computing module 206 can monitor the connection status between the audio peripheral 204 and the information handling system 202; a physical location of the information handling system 202; a current time associated with the information handling system 202; ambient noise levels proximate to the information handling system 202; active applications (e.g., applications "in focus") of the information handling system 202; audio volume of the information handling system 202; noise cancellation of the information handling system 202; and types of devices/peripherals coupled/connected to the information handling system 202.

In some implementations, the audio focus computing module 206 can, in response to monitoring the contextual inputs 213, access the audio focus model 210 including the configuration policy 214. The audio focus computing module 206 can further identify one or more of the configuration rules 216 based on the monitored contextual inputs 213. Furthermore, the audio focus computing module 206 can apply the configuration rules 206 to the information handling system 202. In other words, the audio focus computing module 206 can apply appropriate configuration rules 216 based on the monitored contextual inputs 213 as provided by the audio focus model 210.

In some examples, the audio focus computing module 206 can apply configuration rules 216 to automatically perform one or more computer-implemented actions to enable the video conference 218 of the video conferencing application 220 without user interaction. For example, the audio focus computing module 206 can apply configuration rules 216 such as automatically selecting a hyperlink associated with the video conference 218, selecting an audio source and/or video source associated with the video conference 218, and toggling a mute option associated with the video conference 218.

For example, the audio focus computing module 206 can monitor the contextual inputs 213 and determine that the contextual data 212 indicates that an active application is the video conferencing application 220 and that the audio peripheral 204 (e.g., headphones) is coupled to the information handling system 202. In response, the audio focus computing module 206 can access the audio focus model 210, identify the configuration rules 216 that are applicable to determining that the video conferencing application 220 is the active application and the audio peripheral 204 is coupled to the information handling system 202, and apply such configuration rules 216. For example, the audio focus computing module 206 can applying configuration rules 216 such as selecting a hyperlink to active the video conference 218 and route audio to the audio peripheral 204.

For example, the audio focus computing module 206 can monitor the contextual inputs 213 and determine that the contextual data 212 indicates that an active application is the video conferencing application 220 and that no audio output device (e.g., headphones) is coupled to the information handling system 202. In response, the audio focus computing module 206 can access the audio focus model 210, identify the configuration rules 216 that are applicable to determining that the video conferencing application 220 is the active application and that no peripheral audio output device is coupled to the information handling system 202, and apply such configuration rules 216. For example, the audio focus computing module 206 can applying configuration rules 216 such as selecting a hyperlink to active the video conference 218 and route audio to the native audio output device of the information handling system 202.

For example, the audio focus computing module 206 can monitor the contextual inputs 213 and determine that the contextual data 212 indicates that an active application is the video conferencing application 220, that the video conference 218 includes a hyperlink to be selected, and includes a mute option. In response, the audio focus computing module 206 can access the audio focus model 210, identify the configuration rules 216 that are applicable to determining that the contextual data 212 indicates that an active application is the video conferencing application 220, the video conference 218 includes a hyperlink to be selected, and includes a mute option, and apply such configuration rules 216. For example, the audio focus computing module 206 can apply configuration rules 216 such as selecting the hyperlink to activate the video conference 218, and toggle the mute option of the video conference 218 to the unmute state.

In some examples, the audio focus computing module 206 can apply configuration rules 216 to automatically adjust one or more of the audio-based settings 230 of the information handling system 202 without user interaction. For example, the audio focus computing module 206 can apply configuration rules 216 such as automatically selecting an audio input source, automatically selecting a local noise cancellation level, automatic source separation of input audio, and automatically selecting an audio output source.

For example, the audio focus computing module 206 can monitor the contextual inputs 213 and determine that the contextual data 212 indicates that a location of the information handling system 202 is a at home, and that the time of day is 5 am. In response, the audio focus computing module 206 can access the audio focus model 210, identify the configuration rules 216 that are applicable to determining that the location of the information handling system 202 is at home, and that the time of day is 5 am, and apply such configuration rules 216. For example, the audio focus computing module 206 can apply configuration rules 216 such as disabling a noise cancellation of the information handling system 202.

For example, the audio focus computing module 206 can monitor the contextual inputs 213 and determine that the contextual data 212 indicates that a location of the information handling system 202 is a coffee shop, and that the time of day is 8 am. In response, the audio focus computing module 206 can access the audio focus model 210, identify the configuration rules 216 that are applicable to determining that the location of the information handling system 202 is a coffee shop, and that the time of day is 8 am, and apply such configuration rules 216. For example, the audio focus computing module 206 can apply configuration rules 216 such as enabling a noise cancellation of the information handling system 202.

For example, the audio focus computing module 206 can monitor the contextual inputs 213 and determine that the contextual data 212 indicates that a location of the information handling system 202 is a café. In response, the audio focus computing module 206 can access the audio focus model 210, identify the configuration rules 216 that are applicable to determining that the location is a café, and apply such configuration rules 216. For example, the audio focus computing module 206 can apply configuration rules 216 such as enabling the audio input source as a microphone of the audio peripheral 204.

For example, the audio focus computing module 206 can monitor the contextual inputs 213 and determine that the contextual data 212 indicates that a location of the information handling system 202 is a work place office. In response, the audio focus computing module 206 can access the audio focus model 210, identify the configuration rules 216 that are applicable to determining that the location is a work place office, and apply such configuration rules 216. For example, the audio focus computing module 206 can apply configuration rules 216 such as enabling the audio input source as a native built-in microphone of the information handling system.

For example, the audio focus computing module 206 can monitor the contextual inputs 213 and determine that the contextual data 212 indicates that a location of the information handling system 202 is a café. In response, the audio focus computing module 206 can access the audio focus model 210, identify the configuration rules 216 that are applicable to determining that the location is a café, and apply such configuration rules 216. For example, the audio focus computing module 206 can apply configuration rules 216 such as enabling a noise cancellation of the information handling system 202, and automatic source separation of the input audio to the information handling system 202.

In some implementations, the audio focus computing module 206 can facilitate maintaining a continuity of states of the information handling system 202 as the information handling system 202 transitions between power states. For example, as the information handling system 202 transitions from a full power state to a modern standby power state and from the modern standby power state to the full power state.

Specifically, the audio focus computing module 206 can determine that the information handling system 102 has transitioned to a second power state from a first power state at a first time. For example, the first power state can include a full power state and the second power state can include an idle standby power state (e.g., a modern standby power state). The audio focus computing module 206, while the information handling system 202 is in the second power state, store the contextual data 212 in the cache 208 associated with the monitored contextual inputs 213. The audio focus computing module 206 can, in response determining that the information handling system 202 has transitioned from the second power state to the first power state at a second time after the first time, access the audio focus model 210 including the configuration policy 214. The audio focus computing module 206 can further identify one or more of the configuration rules 216 based on the monitored contextual inputs 213 that are stored in the cache 208. Furthermore, the audio focus computing module 206 can apply the configuration rules 206 to the information handling system 202. In other words, the audio focus computing module 206 can apply appropriate configuration rules 216 based on the monitored contextual inputs 213 as stored by the cache 208, as described further herein.

For example, the audio focus computing module 206 can monitor the stored contextual data 214 and determine that the contextual data 214 indicates that prior to transitioning to the second power state, that the audio peripheral 204 (e.g., headphones) are coupled to the information handling system 202. In response, when the information handling system 202 transitions back to the first power state from the second power state, the audio focus computing module 206 can access the audio focus model 210, identify the configuration rules 216 that are applicable to the audio peripheral 204 being coupled to the information handling system 202, and apply such configuration rules 216. For example, the audio focus computing module 206 can apply configuration rules 216 such as directing audio to the audio peripheral 204.

FIG. 3 illustrates a flowchart depicting selected elements of an embodiment of a method 300 for reducing audio-based distractions in an information handling system. The method 300 may be performed by the information handling system 202 and/or the audio focus computing module 206, and with reference to FIGS. 1-2. It is noted that certain operations described in method 300 may be optional or may be rearranged in different embodiments.

The audio focus computing module 206 can perform, at a first time, a calibration and configuration of the audio focus model 210 (302). The audio focus computing module 206 can identify contextual data 212 associated with the contextual inputs 212 of the information handling system 202 (304). In some examples, the contextual data 212 can include such contextual data as user settings contextual data, system settings contextual data, and environment settings contextual data. The audio focus computing module 206 can train, based on the contextual data 212, the audio focus model 210 (306). In some examples, the audio focus computing module 206 can generate, based on the contextual data 212 identified at the first time, a configuration policy 214 that includes configuration rules 216. In some examples, the configuration rules 216 are rules for automatically performing computer-implemented actions for enabling a video conference 218 of a video conferencing application 220 executing on the information handling system 202 without user interaction. In some examples, the configuration rules 216 are rules for automatically adjusting audio-based settings of the information handling system 202 without user interaction.

The audio focus computing module 206 can perform, at a second time after the first time, a steady-state monitoring of the information handling system 202 (308). The audio focus computing module 206 can monitor the contextual inputs 213 of the information handling system 202 (310). The audio focus computing module 206 can, in response to monitoring the contextual inputs 213, access the audio focus model 210 including the configuration policy 214 (312). The audio focus computing module 206 can further identify one or more of the configuration rules 216 based on the monitored contextual inputs 213 (314). The audio focus computing module 206 can apply the configuration rules 206 to the information handling system 202 (316). In some examples, the audio focus computing module 206 can apply configuration rules 216 to automatically enable the video conference 218 of the video conferencing application 220 without user interaction. In some examples, the audio focus computing module 206 can apply configuration rules 216 to automatically adjust one or more of the audio-based settings 230 of the information handling system 202 without user interaction.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for reducing audio-based distractions in an information handling system, comprising:
    performing, by an audio focus computing module and at a first time, a calibration and configuration of an audio focus model, including:
        identifying contextual data associated with contextual inputs to the information handling system, the contextual data including user settings contextual data, system settings contextual data, and environmental settings contextual data;
        training, based on the contextual data, the audio focus model, including generating a configuration policy including configuration rules, the configuration rules for automatically performing computer-implemented actions for enabling a video conference of a video conferencing application executing on the information handling system without user interaction;
    performing, by the audio focus computing module at a second time, a steady-state monitoring of the information handling system, including:
        monitoring the contextual inputs of the information handling system; and
        in response to monitoring the contextual inputs, i) accessing the audio focus model including the configuration policy, ii) identifying one or more of the configuration rules based on the monitored contextual inputs, and iii) applying the one or more configuration rules to perform one or more of the computer-implemented actions to automatically enable the video conference of the video conferencing application executing on the information handling system without user interaction.

2. The computer-implemented method of claim 1, further comprising:
    determining that the information handling system has transitioned to a second power state from a first power state, the second power state being an idle standby power state;
    while the information handling system is in the second power state, storing data associated with the monitored contextual inputs;
    determining that the information handling system has transitioned from the second power state to the first power state; and
    in response to determining that the information handling system has transitioned from the second power state to the first power state, i) accessing the audio focus model including the configuration policy, ii) identifying one or more of the configuration rules based on the monitored contextual inputs, and iii) applying the one or more configuration rules to perform one or more of the computer-implemented actions to automatically enable the video conference of the video conferencing application executing on the information handling system without user interaction.

3. The computer-implemented method of claim 1, wherein applying the one or more configuration rules includes automatically selecting a hyperlink associated with the video conference.

4. The computer-implemented method of claim 1, wherein applying the one or more configuration rules includes automatically selecting an audio source and/or video source associated with the video conference.

5. The computer-implemented method of claim 1, wherein applying the one or more configuration rules includes automatically toggling a mute option associated with the video conference.

6. The computer-implemented method of claim 1, wherein monitoring the contextual inputs includes determining a connection status between an audio-based peripheral and the information handling system.

7. The computer-implemented method of claim 1, wherein monitoring the contextual inputs includes identifying a location of the information handling system.

8. The computer-implemented method of claim 1, wherein monitoring the contextual inputs including identifying a current time.

9. The computer-implemented method of claim 1, wherein monitoring the contextual inputs includes identifying environment ambient noise levels.

10. The computer-implemented method of claim 1, wherein the configuration rules further include configuration rules for automatically adjusting audio-based settings of the information handling system without user interaction.

11. The computer-implemented method of claim 10, wherein applying the one or more configuration rules further includes applying the one or more configuration rules to automatically adjust the one or more audio settings of the information handling system without user interaction.

12. The computer-implemented method of claim 11, wherein applying the one or more configuration rules includes automatically selecting an audio input source.

13. The computer-implemented method of claim 11, wherein applying the one or more configuration rules includes automatically selecting a local noise cancellation level.

14. The computer-implemented method of claim 11, wherein applying the one or more configuration rules includes automatic source separation of input audio.

15. The computer-implemented method of claim 11, wherein applying the one or more configuration rules includes automatically selecting an audio output source.

16. An information handling system comprising a processor having access to memory media storing instructions executable by the processor to perform operations, comprising:
performing, by an audio focus computing module and at a first time, a calibration and configuration of an audio focus model, including:
identifying contextual data associated with contextual inputs to the information handling system, the contextual data including user settings contextual data, system settings contextual data, and environmental settings contextual data;
training, based on the contextual data, the audio focus model, including generating a configuration policy including configuration rules, the configuration rules for automatically performing computer-implemented actions for enabling a video conference of a video conferencing application executing on the information handling system without user interaction;
performing, by the audio focus computing module at a second time, a steady-state monitoring of the information handling system, including:
monitoring the contextual inputs of the information handling system; and
in response to monitoring the contextual inputs, i) accessing the audio focus model including the configuration policy, ii) identifying one or more of the configuration rules based on the monitored contextual inputs, and iii) applying the one or more configuration rules to perform one or more of the computer-implemented actions to automatically enable the video conference of the video conferencing application executing on the information handling system without user interaction.

17. The information handling system of claim 16, the operations further comprise:
determining that the information handling system has transitioned to a second power state from a first power state, the second power state being an idle standby power state;
while the information handling system is in the second power state, storing data associated with the monitored contextual inputs;
determining that the information handling system has transitioned from the second power state to the first power state; and
in response to determining that the information handling system has transitioned from the second power state to the first power state, i) accessing the audio focus model including the configuration policy, ii) identifying one or more of the configuration rules based on the monitored contextual inputs, and iii) applying the one or more configuration rules to perform one or more of the computer-implemented actions to automatically enable the video conference of the video conferencing application executing on the information handling system without user interaction.

18. The information handling system of claim 16, wherein the configuration rules further include configuration rules for automatically adjusting audio-based settings of the information handling system without user interaction.

19. The information handling system of claim 18, wherein applying the one or more configuration rules further includes applying the one or more configuration rules to automatically adjust the one or more audio settings of the information handling system without user interaction.

20. A non-transitory computer-readable medium storing software comprising instructions executable by one or more computers which, upon such execution, cause the one or more computers to perform operations comprising:
performing, by an audio focus computing module and at a first time, a calibration and configuration of an audio focus model, including:
identifying contextual data associated with contextual inputs to the information handling system, the contextual data including user settings contextual data, system settings contextual data, and environmental settings contextual data;
training, based on the contextual data, the audio focus model, including generating a configuration policy including configuration rules, the configuration rules for automatically performing computer-implemented actions for enabling a video conference of a video conferencing application executing on the information handling system without user interaction;
performing, by the audio focus computing module at a second time, a steady-state monitoring of the information handling system, including:
monitoring the contextual inputs of the information handling system; and
in response to monitoring the contextual inputs, i) accessing the audio focus model including the configuration policy, ii) identifying one or more of the configuration rules based on the monitored contextual inputs, and iii) applying the one or more configuration rules to perform one or more of the computer-implemented actions to automatically enable the video conference of the video conferencing application executing on the information handling system without user interaction.

* * * * *